United States Patent
Shimizu

[11] Patent Number: 5,375,599
[45] Date of Patent: Dec. 27, 1994

[54] ORGANICALLY RESPONSIVE SCROLLING IN ULTRASONIC DIAGNOSTIC EQUIPMENT

[75] Inventor: Yutaka Shimizu, Settsu, Japan
[73] Assignee: Shimadzu Corporation, Kyoto, Japan
[21] Appl. No.: 51,703
[22] Filed: Apr. 26, 1993
[30] Foreign Application Priority Data
Apr. 30, 1992 [JP] Japan .................................. 4-110932
[51] Int. Cl.$^5$ ................................................ A61B 8/00
[52] U.S. Cl. ............................ 128/660.04; 128/660.05
[58] Field of Search .......... 128/660.01, 660.04–600.05, 128/660.07, 661.04, 661.08–611.10

[56] References Cited

U.S. PATENT DOCUMENTS 3,954,098 5/1976 Dick et al. ........................ 128/660.04

Primary Examiner—Francis Jaworski
Attorney, Agent, or Firm—Nikaido, Marmelstein, Murray & Oram

[57] ABSTRACT

Ultrasonic diagnostic equipment in which a probe beams ultrasonic waves into a living body under examination and detects reflected ultrasonic signals echoed or scattered therefrom. Data obtained from detected signals reflected from sounding lines of the ultrasonic emission are processed by a transmit and receive circuit or a Doppler detector to produce imaging data for M-mode display (corresponding to one radial or other line of a B-scan sweep) or for Doppler-mode display, on a video display monitor. The imaging data are written into a line memory driven by a 3 KHz clocking signal. In turn, the cycles of imaging data from the line memory are overwritten into a display memory via a clocking signal at a frequency selected by a display scrolling speed controller. The display scrolling speed controller, given an operator-selected display heartbeat number indicating how many heart beats is to be displayed per frame on the monitor, varies the speed at which recorded organic data are scrolled on screen according to the rate of periodicity of an organic function, e.g. of the heart, as measured by a measurement means. Scrolling-on of data in display is thus at a speed varying in synchronization with the rate of periodicity of the organic function so that data indicating and subject to the influence of periodic variance of the organic function in connection with examination is properly displayed as required for diagnosis.

12 Claims, 5 Drawing Sheets

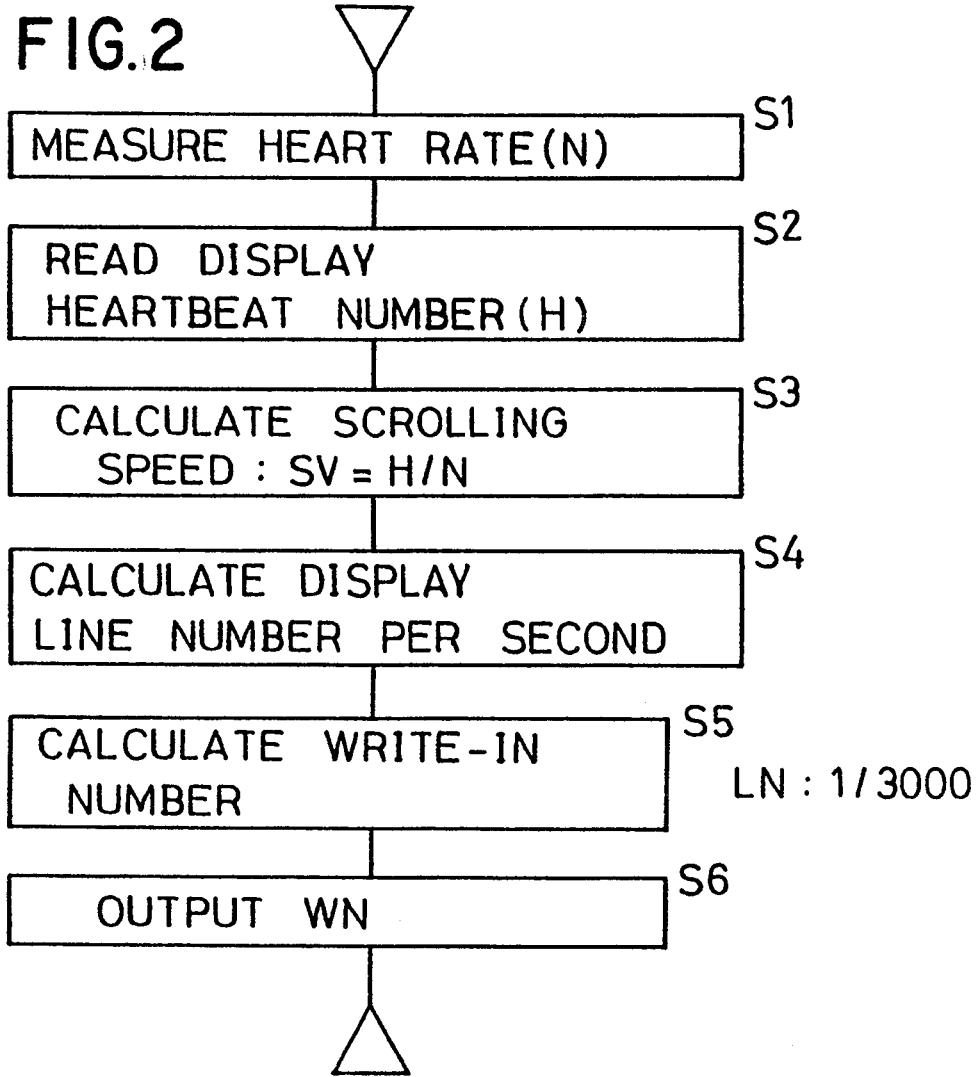
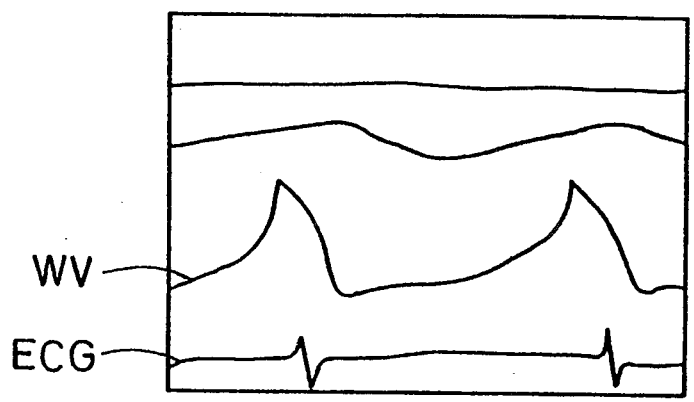

ORGANICALLY RESPONSIVE SCROLLING IN ULTRASONIC DIAGNOSTIC EQUIPMENT

BACKGROUND OF THE INVENTION

The present Invention relates to ultrasonic diagnostic equipment which provides organic visual display derived from probing ultrasonic waves echoed from a living body under examination; particularly it relates to such equipment in which the display is scrolled in correspondence with periodically elapsing changes in monitored organic data obtained for purposes of diagnosing organic functions of the living body.

As is well-known in the background to this technology, ultrasonic waves emitted via a probe containing ultrasonic transducers are beamed into a patient, typically for cardiovascular diagnosis. Ultrasonic signals are organically reflected from within the patient back to the probe, via which they are processed by the diagnostic equipment to provide information such as internal organic structure and bloodstream function.

The ultrasonic diagnostic equipment can provide M-mode display, i.e. a trace describing organic time-motion data wherein unilinearly scanned change In distance to a continually moving (typically pulsing) object of observation, e.g., the tissue interface of an organ, during an elapsed interval is recorded in a trace line periodically scrolled onto the display. Echoed ultrasound signals pulsed In diagnostic probing by the equipment can alternatively be processed through a Doppler mode, which takes advantage of the Doppler effect to analyze a sample volume in a region of a flowing medium, and through which, for example, display indicating rate and direction of flow in the bloodstream can be generated.

The speed at which such recordings are scrolled onto the display screen. (which corresponds to the "roll cycle" of data imaging) can be controlled in several gradations, whereby an operator can choose the scrolling speed which will allow proper diagnosis of the particular organic condition in a patient.

Conventionally, the equipment operating system therein necessitates that the operator must observe either the M-mode trace or Doppler-mode recording on the display in order to determine the correct scrolling speed. If the scrolling speed is incorrectly determined, or should it otherwise not be synchronized correctly, difficulties arise wherein, for example, recording patterns representing data on organic function in correspondence with heart rate appear only partially in one frame of the display, disabling complete diagnosis, or in which a frame is crowded by the recordings, to an extent making the information indistinguishable for diagnosis. Likewise, improper scrolling can interfere with measurement of bloodstream characteristics, wherein the display is scrolled at instances which do not correspond to those real-time elapsed organic changes required in order to achieve effective recording of bloodstream data.

SUMMARY OF THE INVENTION

It is an object of the present invention to ensure that in the diagnostic display of organic information, scrolling of the display screen required to indicate periodically elapsing organic changes is synchronized correctly with those changes.

Ultrasonic diagnostic equipment according to an aspect of the present invention beams ultrasonic waves into an organism under examination and displays organic data processed from detected ultrasonic signals reflected from the organism. The equipment comprises a probe containing an array of transducers for both emitting and detecting ultrasound, transmit and receive means, display means, measurement means, and display scrolling speed control means. The transmit and receive means transmits transducer actuating signals to the probe, phase-delayed to provide electronic focusing, and processes reflected ultrasonic signals received via the probe. The display means includes a video display monitor, and records elapsing periodic changes in organic data as gathered by the transmit and receive means by correspondingly scrolling on-screen new frames of display. The measurement means determines rate of functional periodicity of an organ in connection with examination. The display scrolling speed control means varies the speed at which recorded organic data are scrolled on screen according to the rate of organic function periodicity as measured by the measurement means.

Scrolling-on of data in display by the inventively embodied diagnostic equipment is at a speed varying in synchronization with the rate of periodicity of an organic function, e.g. with heartbeat, so that data indicating and subject to the influence of periodic variance of an organic function under examination is properly displayed as required for diagnosis.

The foregoing and other objects and advantages of the present invention will become more apparent from the following detailed description, made with reference to the accompanying drawings.

BRIEF DESCRIPTION OF THE DRAWINGS

FIG. 2 is a flowchart showing operational steps defined by a speed operator logic of the equipment;

FIG. 3 schematically depicts an example of a monitor display;

DESCRIPTION OF PREFERRED EMBODIMENTS

Figure 1:
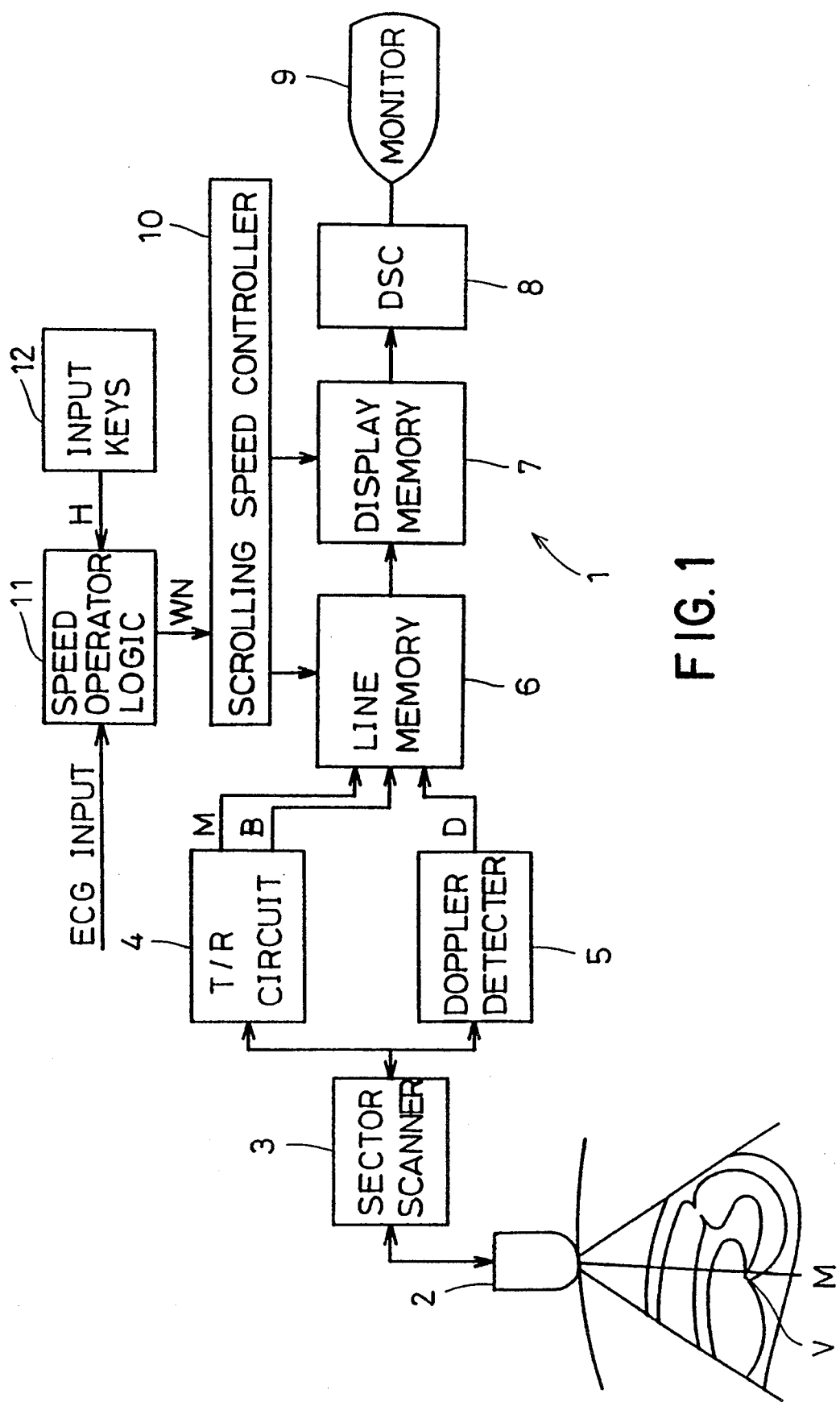
FIG. 1 is a highly schematic block diagram of ultrasonic diagnostic equipment according to an embodiment of the present invention.

The ultrasonic diagnostic equipment as an embodiment or the present invention represented by FIG. 1 is capable of displaying recordings made in a Doppler-mode thereof; it can also display time-motion recordings as an M-mode trace, and can provide mappings of organic structure in the so-called B-scanning mode.

For the sake of description, the ultrasonic diagnostic equipment may be divided into a main apparatus 1, to which is connected a separable probe 2, as indicated in the figure.

The probe 2 contains an array of micro-transducers and is connected to a sector scanner 3 of the main apparatus 1. The sector scanner 3 comprises a circuit of delay lines which, as controlled by a delay Interval selection circuit, distribute at different timings each of transducer-triggering pulses to select clusters of transducers in alternation along the array, so as to effect electronic focusing in the course of electronic scanning, as well as variable-depth dynamic focusing.

The sector scanner 3 is connected to a transmit and receive circuit 4 and a Doppler detector 5. The transmit and receive circuit 4 consists inter alia of a high-frequency oscillator which excites the transducer array to emit ultrasonic waves, and a receiver receiving signals detected from ultrasonic waves echoed or otherwise reflected through scattering. The Doppler detector 5 consists inter alia of a 90° phase shifter, a mixer, and an A/D conversion circuit.

The transmit and receive circuit 4 and the Doppler detector 5 are connected to a sub memory, in this case a line memory 6, pulsed-sequentially storing digitally converted data which will generate one vertical line on the monitor 9. Therein the transmit and receive circuit 4 sequentially outputs display imaging data, obtained from unilinear M-mode scanning of the ultrasonic beam and/or from along one axis of scanning in B-mode, to the line memory 6, meanwhile the Doppler detector 5 likewise outputs Doppler data; wherein in either case the data are derived from one sounding line of the unilinearly beamed ultrasound. One sounding line is herein defined to be those data obtained during the interval, known as the "dwell time," required in order to receive information from the object of observation in the living body, which interval is dependent upon the ultrasound frequency, its speed through the intervening medium, and depth to the object (in particular, to tissue/tissue and or tissue/fluid interfaces).

The imaging or Doppler data are written into the line memory 6 at a clock signal frequency of, for example, 3 KHz. The line memory 6 is connected to a display memory 7 which stores imaging data for generating a color image in a display raster of 512 vertical × 256 horizontal lines. The display memory 7 is connected to a DSC (digital scan convertor) 8, which converts the image data read out of the display memory 7 into video signals, and outputs them to a video display monitor 9.

Connected to both the line memory 6 and the display memory 7 is a scrolling speed controller 10, which governs scrolling speed by selecting data overwrite cycles in the writing of data storing in the line memory 6, i.e. of the imaging data gathered in either the time-motion mode (M) and/or the brightness-imaging (B) mode, or of the Doppler data (D), from the line memory 6 into the display memory 7. A speed operator logic 11 is connected to the scrolling speed controller 10. Electrocardiograph input, and data on display heartbeat number, are input to the speed operator logic 11. The heartbeat number data is operator-selected via input keys 12, and indicates data corresponding to how many heart beats is to be displayed per frame on the monitor.

In operation, then, of the ultrasonic diagnostic equipment constructed as aforedescribed, the probe 2 beams ultrasonic waves into a living body under examination and detects reflected ultrasonic signals echoed or scattered therefrom. Data obtained from detected signals reflected in a unilinear ultrasonic beaming are processed by the transmit and receive circuit 4 to produce imaging data for M-mode display (corresponding to one radial or other line of a B-scan sweep); for Doppler-mode display, the Doppler detector 5 processes data detected from the reflected ultrasonic signals so as to generate display imaging data accordingly. The M-mode or Doppler-mode imaging data are written into the line memory 6 driven by the 3 KHz clocking signal. In turn, the cycles of imaging data from the line memory 6 are overwritten into the display memory 7 via a clocking signal at frequency selected by the scrolling speed controller 10.

The speed operator logic 11 calculates write-in number WN data, for input to the scrolling speed controller 10, as follows.

At step S1 in the flowchart of FIG. 2, the speed operator logic 11 records the heart rate N, indicating heartbeats per second, according to electrocardiograph input from an associated electrocardiograph. At step S2, the speed operator logic 11 reads data input through the input keys 12 designating the display heart beat number H. At step S3, the scroll speed SV is calculated according to the heart rate data N and the display heartbeat number data H.

Given that the heart rate data is $N=1$ (one heartbeat/sec.) and the display heartbeat number data is 2 (wherein two heartbeats are to be continuously displayed), the scroll speed SV will be as shown by the following equation:

$$SV = H/N = 2$$

That is, the scrolling speed SV is determined such that data on the latest two heartbeats are displayed every two seconds. At step S4, the number of lines displayed per second is calculated, wherein given that the number of vertical display lines (assuming that scrolling is horizontal, in which case it is left to right by convention) on the monitor 9 is 512, the display line number DN will be as shown by the following equation:

$$DN = 512/SV$$

Accordingly, if the scroll speed SV is "2", the display line number DN, indicating the display scanning rate in lines per second, is "256". At step S5, data determining a display memory 7 line address write-in number WN is calculated as the inverse of the product of the clock signal period LN at which data is written into line memory 6, and the display line number DN. Hence, wherein LN is 1/3000 second, WN will be determined as follows:

$$WN = 3000/256 = 11.8$$

Thus, in order that a new display line is scrolled on every 1/256 second, data written into the line memory 6 at the 3 KHz clocking frequency digitally corresponding to every 11 to 12 sounding lines should be overwritten into one display line address of the display memory 7.

At step S6, the calculated write-in number WN data is output to the scrolling speed controller 10. Therein, the scrolling speed will be adjusted in dependency on the data containing the write-in number WN, as detailed below.

The write-in number WN data is delivered to the scrolling speed controller 10 at the start of imaging for display in either M-mode or Doppler-mode. The WN number therein selects cycles of data from the line memory 6 as overwritten sequentially into the display memory 7 addresses, wherein the display data are input at what is equivalent to scrolling speed variable according to heart rate. The data in the display memory 7 are output to the DSC 8 to drive the video display monitor 9 accordingly.

Hence, "slot-change rate," i.e. periodicity of the cycles of data overwritten from the line memory 6 into the display memory 7, is variable according to the measured heart rate given the operator-designated display heartbeat number, such that heart beat imaging data is constant on the monitor 9 display, in keeping with fluctuations in the heart rate.

FIG. 3 schematically illustrates an example of display on the monitor 9. ECG (electrocardiogram) display is shown in the lower portion of the figure, above which is shown an image in the M-mode of display.

Change in the status of the action WV of a bicuspid valve V (schematically illustrated in FIG. 1 by a representative B-mode scanning display at the patient inspection site) in heartbeat function is displayed in M-mode. In this case, the display heartbeat number H=2, such that an image corresponding to two heartbeats is displayed within the monitor 9 raster in the M-mode portion of the display. Accordingly in this example, accurate measure of blood flow rate at the bicuspid valve V crucial to correct diagnosis of heart disease is ensured.

Figure 4:
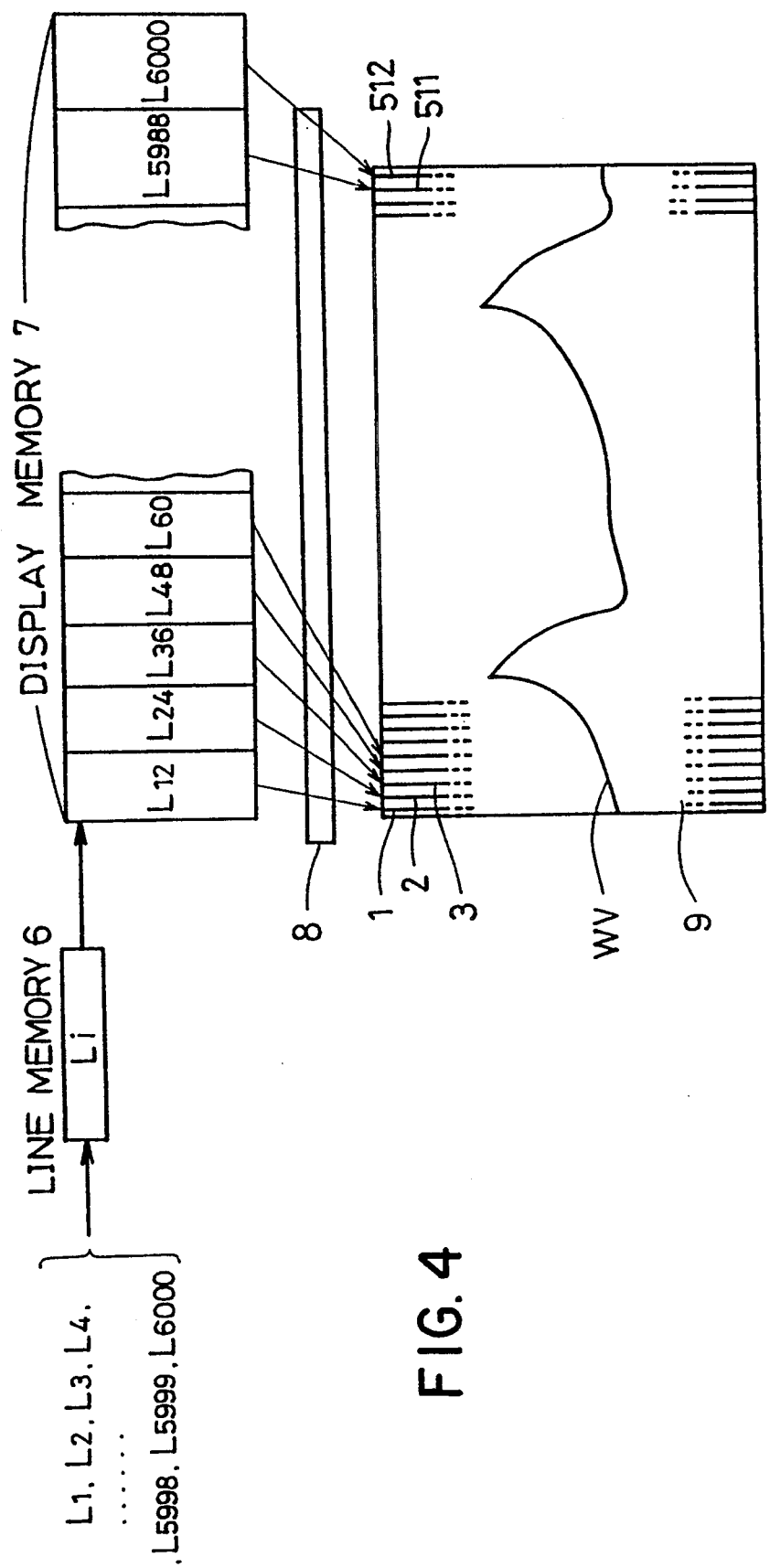
FIG. 4 is a schematic diagram illustrating relation between a display memory and corresponding M-mode recording display.
Figure 5:
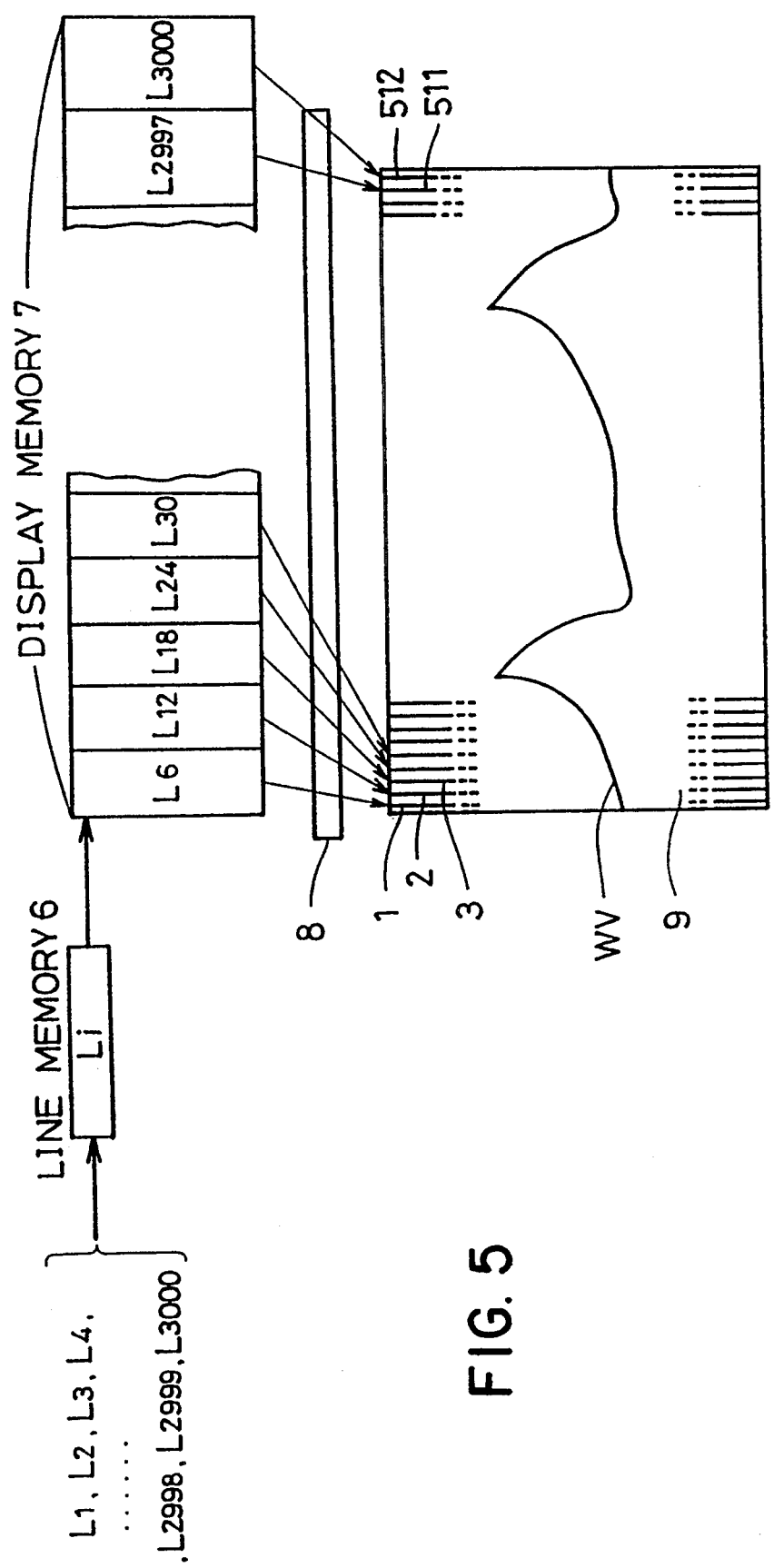
FIG. 5 is a schematic diagram corresponding to FIG. 4, wherein a parameter WN determining scrolling rate of the recording display is halved.

FIGS. 4 and 5 are schematic diagrams which illustrate relation between sounding-line overwrite cycles in the line memory 6, display line addresses in the display memory 7, and M-mode imaging display on the video display monitor 9. FIG. 4 corresponds to conditions as given In the foregoing example, wherein the write-in number WN data is 12. The first display line address of the display memory 7 is overwritten by each of the first twelve sounding-line data in sequential output from the line memory 6, whereupon the corresponding overwritten line display data $L_{12}$ is output to the DSC 8 to generate the first-scanned vertical line on the monitor 9 display. Meanwhile the next twelfth-latest line display data $L_{24}$ corresponding to the subsequently input series of sounding-line data is overwritten into the second display line address of the display memory 7 and subsequently output to the DSC 8 to generate the second-scanned vertical line on the monitor 9 display. This operation continues until the 6000th line memory 6 sounding-line data (in two seconds clocking at 3 KHz) is overwritten into the 512th display line address of the display memory 7, and the line display data $L_{6000}$ generates the 512th vertical line of display on the video display monitor 9. Display for a given two seconds in M-mode imaging is thus illustrated in FIG. 4 as it appears on the monitor 9.

FIG. 5 illustrates the situation for a case wherein parameters are similar to those of the foregoing, with the exception that the heart rate N is "2" rather than "1". Therefore the scrolling speed SV becomes half that of the previous example, (i.e., 1); the display line number DN is double (512), and the write-in number WN data is half (6).

Since the write-in number WN data is 6, one vertical line is generated on the monitor 9 in correspondence with data derived from every six sounding lines sequentially clocked into the line memory 6. As FIG. 5 shows, although the heart rate has doubled in comparison with the situation illustrated by FIG. 4, an image according to cardiac activity during two heartbeats is nevertheless displayed within the monitor 9 raster. In this case M-mode imaging of data on the latest two heartbeats, as indicated in FIG. 5, is replaced every second by the scrolling of the sequentially-scanned display.

Other Embodiments (a) The write-in number WN data in the foregoing embodiment is calculated by the speed operator logic 11 as a software process. Alternatively, calculation of WN can be effected via hardware as follows.

Figure 6:
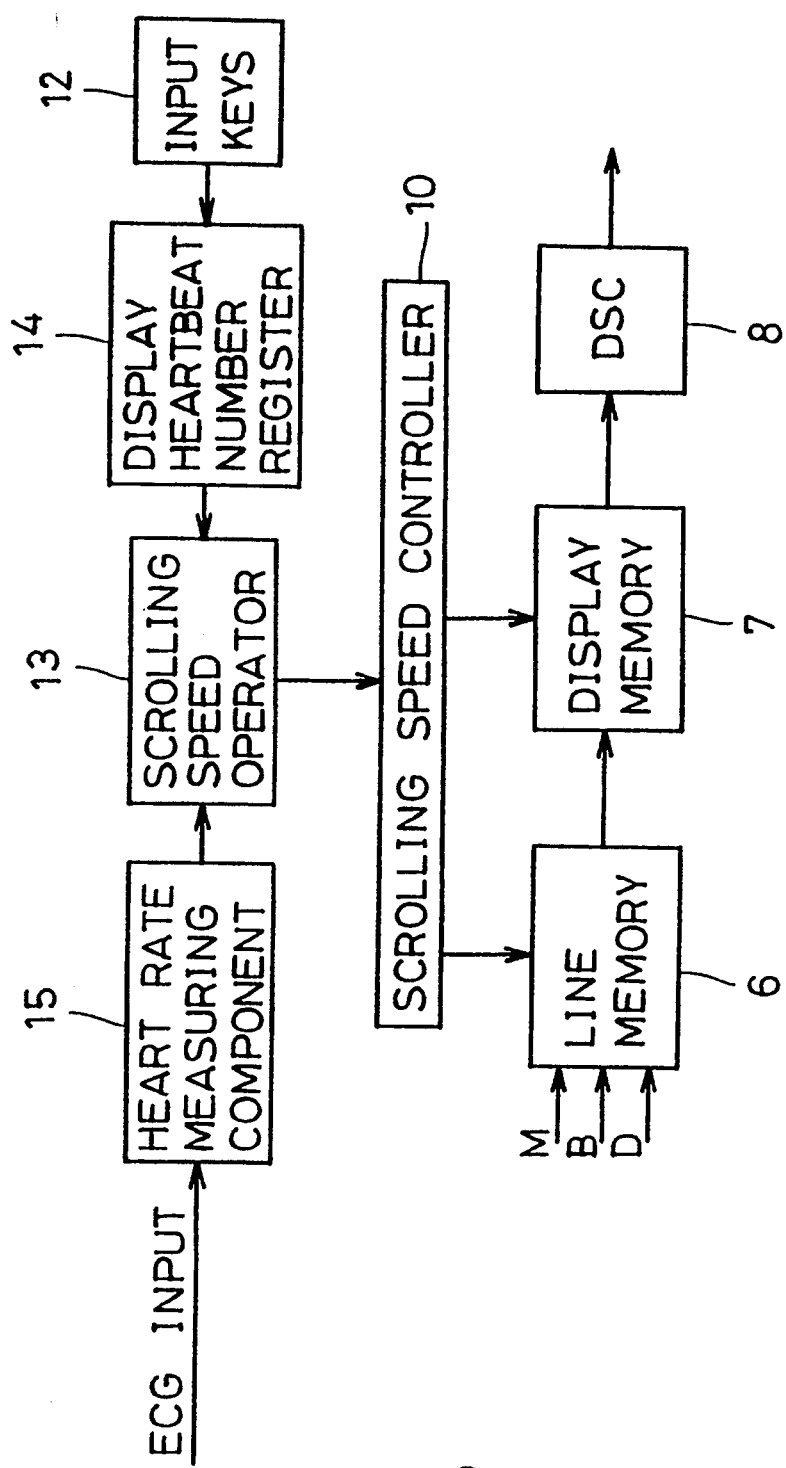
FIG. 6 is a highly schematic block diagram corresponding to FIG. 1 of another embodiment.

FIG. 6 illustrates a hardware construction thus according to another embodiment. Electrocardiograph Input is fed to a heart rate measuring component 15, which calculates the heart rate according to the electrocardiograph Input and transmits the derived output to a scrolling speed operator 13. The scrolling speed operator 13 reads data from a register 14 storing display heartbeat number data input through the input keys 12, and then calculates the write-in line number according to the measured heart rate and the display heartbeat number and outputs it to the scrolling speed controller 10.

Other structures and corresponding operations are likewise as in the aforedescribed embodiment, hence their description is omitted.

(b) Periodically elapsing changes of organic information can be scrolled on display in Doppler-mode imaging as well. Moreover, images for M-mode or Doppler-mode display can be selected to be scrolled on screen from a display containing composite imaging, including a combination of either B-mode and Doppler-mode images, or of B-mode and M-mode images.

(c) Data determining the heart rate number N need not be derived exclusively from electrocardiographic input, but may be obtained through other means, such as by employing already "captured" data detected from the reflected ultrasonic waves in the sector scanner; through blood pressure monitoring apparatus; by cardio-acoustic monitoring; or by other suitable means.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. Ultrasonic diagnostic equipment which beams ultrasonic emission in diagnostic sounding lines into an organism and, through processing echoed and scattered signals from said ultrasonic emission which are received by said equipment from within the organism, displays data pertaining to, the organism, said equipment comprising:

a probe, said probe containing transducing means for generating said ultrasonic emission and beaming said ultrasonic emission into a portion of the organism under diagnosis, said transducing means also for detecting the ultrasonic signals echoed therefrom and scattered thereby;

transmit and receive means coupled to said probe, for transmitting transducing means actuation signals to said probe, and for processing said signals detected by said probe so as to obtain said data pertaining to said organism;

display means coupled to a video display monitor and said transmit and receive means, for continuous real-time display on said video display monitor of said data obtained by said transmit and receive means, wherein said display means scrolls the display at a scrolling speed corresponding to periodically elapsing changes in said data pertaining to said organism;

periodicity measuring means for measuring rate of a periodic organic function in connection with the portion of the organism under diagnosis; and means for varying the scrolling speed in the display of said data according to the rate measured.

2. Ultrasonic diagnostic equipment according to claim 1, further comprising data input means for designating display period number of said periodic organic function in said display of said organic data; wherein said scrolling speed varying means includes a scrolling-speed operator logic for calculating scrolling speed in said display of said organic data according to said rate measured by said measurement means and the designation through said data input means, and a scrolling speed controller for controlling speed at which sequentially scanned raster lines in the display of said organic data are scrolled onto said video display monitor, according to the scrolling speed calculated by said scrolling-speed operator logic.

3. Ultrasonic diagnostic equipment according to claim 2, wherein said display means includes a sub memory means for storing data obtained from one sounding line of said ultrasonic emission, and as a main memory means a store having addresses corresponding to the raster scanning lines of said video display monitor, for storing overwritten cycles of the sounding line data to drive raster-line scanning in the display of said organic data; and said scrolling speed controller controls number of cycles of organic data in said sub memory means as overwritten into said main memory means.

4. Ultrasonic diagnostic equipment according to claim 3, wherein said scrolling-speed operator logic calculates data determining a write-in number, and outputs the write-in number data to said scrolling speed controller; and said write-in number selects cycles of said sounding-line data as overwritten from said sub memory sequentially into the store addresses of said main memory means.

5. Ultrasonic diagnostic equipment according to claim 4, wherein said periodicity measuring means measures said rate of periodic organic function over a given interval; and said scrolling speed operator logic comprises a first operator for calculating the scrolling speed according to said display period number as input through said data input means and to the organic function periodicity rate measured by said periodicity measuring means;

a second operator for calculating display line-number data determining how many raster lines are scanned per the given interval during said display of said organic data, according to the scrolling speed calculated by said first operator and to a total number of display lines composing the raster of said video display monitor in a direction in which the display is scrolled; and a third operator for calculating data generating said write-in number, according to period of signals clocking writing of the sounding-line data into said sub memory means and to the display line number per said given interval as calculated by said second operator.

6. Ultrasonic diagnostic equipment according to claim 5, wherein said first operator calculates the scrolling speed by dividing said display period number by said organic function periodicity rate as measured by measurement means;

said second operator calculates the display line number per the given interval by dividing said total number of display lines by the scrolling speed calculated by said first operator; and said third operator calculates said write-in number data as the inverse of the clocking signal period multiplied by the display line number, as calculated by said second operator per the given interval.

7. Ultrasonic diagnostic equipment according to claim 6, wherein said sub memory means storing data obtained from one sounding line of said ultrasonic emission is a line memory; and said main memory means storing overwritten cycles of the sounding line data is a display memory which stores data sufficient to drive raster-line scanning of said total number of display lines composing the raster of said video display monitor.

8. Ultrasonic diagnostic equipment according to claim 7, wherein said processing by said transmit and receive means of said ultrasonic signals detected by said probe is by a transmit and receive circuit which obtains said organic data as imaging data corresponding to said portion of the organism, for store into said display memory in said overwritten cycles; and said transmit and receive means further comprises a Doppler detector for obtaining blood stream data of the organism.

9. Ultrasonic diagnostic equipment according to claim 8, wherein said display means includes a digital scan converter which reads said imaging data out of said display memory and converts said imaging data into television signals.

10. Ultrasonic diagnostic equipment according to claim 6, wherein said periodic organic function is heartbeat of the organism under diagnosis.

11. Ultrasonic diagnostic equipment according to claim 10, wherein said imaging data provides M-mode display.

12. Ultrasonic diagnostic equipment according to claim 11, wherein said display means provides electrocardiographic display in a lower portion of a screen comprising the raster of said monitor, and M-mode imaging scrolled according to said display period number in an upper portion of said monitor.

* * * * *